(12) United States Patent
Sugita

(10) Patent No.: US 10,936,357 B2
(45) Date of Patent: Mar. 2, 2021

(54) SEMICONDUCTOR DEVICE

(71) Applicant: RENESAS ELECTRONICS CORPORATION, Tokyo (JP)

(72) Inventor: Yasuhiro Sugita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 87 days.

(21) Appl. No.: 16/189,449

(22) Filed: Nov. 13, 2018

(65) Prior Publication Data

US 2019/0196865 A1   Jun. 27, 2019

(30) Foreign Application Priority Data

Dec. 25, 2017 (JP) ................................ 2017-247755

(51) Int. Cl.

| | |
|---|---|
| *G06F 9/48* | (2006.01) |
| *G06F 9/455* | (2018.01) |
| *G06F 9/30* | (2018.01) |
| *G06F 9/54* | (2006.01) |

(52) U.S. Cl.
CPC ........ *G06F 9/4812* (2013.01); *G06F 9/30076* (2013.01); *G06F 9/45558* (2013.01); *G06F 9/48* (2013.01); *G06F 9/485* (2013.01); *G06F 9/546* (2013.01); *G06F 2009/45575* (2013.01); *G06F 2009/45579* (2013.01); *G06F 2209/481* (2013.01); *G06F 2209/547* (2013.01)

(58) Field of Classification Search
CPC ............... G06F 9/45558; G06F 9/4812; G06F 9/45533; G06F 2009/45575; G06F 9/327; G06F 9/485; G06F 9/30076; G06F 9/546; G06F 2209/547; G06F 2209/481

See application file for complete search history.

(56) References Cited

U.S. PATENT DOCUMENTS

| | | |
|---|---|---|
| 8,489,789 B2 | 7/2013 | Serebrin et al. |
| 9,286,091 B2 | 3/2016 | Adachi et al. |

(Continued)

FOREIGN PATENT DOCUMENTS

| | | |
|---|---|---|
| JP | 2013-519169 A | 5/2013 |
| JP | 2013-210962 A | 10/2013 |

OTHER PUBLICATIONS

Extended European Search Report issued in corresponding European Patent Application No. 18214989.8-1224, dated Jul. 31, 2019.

*Primary Examiner* — Dong U Kim
(74) *Attorney, Agent, or Firm* — McDermott Will & Emery LLP

(57) ABSTRACT

There is a need to provide a semiconductor device that improves an interrupt capability of a virtual machine. A semiconductor device includes a memory to store a plurality of virtual machines and a virtual machine manager to manage the virtual machines and a CPU to perform the virtual machines and the virtual machine manager. The CPU causes an active virtual machine to perform an interrupt process when information (first information) about an interrupt-processing virtual machine is equal to information (second information) about the active virtual machine. When the first information differs from the second information, the CPU causes the virtual machine manager to stop the active virtual machine and operates the interrupt-processing virtual machine to perform an interrupt process.

7 Claims, 15 Drawing Sheets

(56) References Cited

U.S. PATENT DOCUMENTS

| | | | |
|---|---|---|---|
| 2011/0106993 A1* | 5/2011 | Arinobu | G06F 9/45533 710/262 |
| 2013/0042236 A1* | 2/2013 | Kagan | G06F 9/45558 718/1 |
| 2013/0047157 A1* | 2/2013 | Suzuki | G06F 9/45533 718/1 |
| 2013/0174148 A1* | 7/2013 | Amit | G06F 9/45558 718/1 |
| 2016/0077848 A1* | 3/2016 | Tu | G06F 9/45558 718/1 |
| 2016/0098289 A1* | 4/2016 | Lim | G06F 9/45558 718/1 |

* cited by examiner

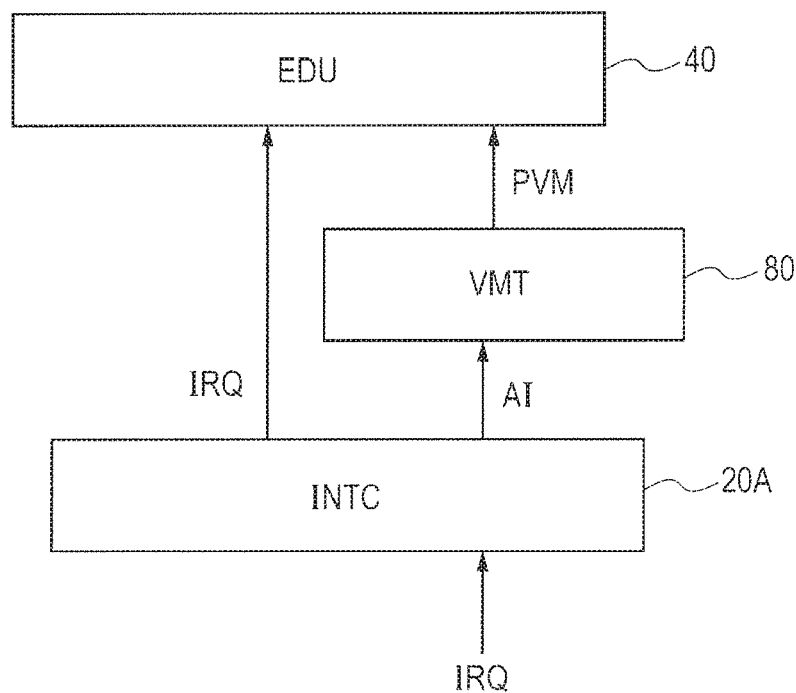

SEMICONDUCTOR DEVICE

CROSS-REFERENCE TO RELATED APPLICATIONS

The disclosure of Japanese Patent Application No. 2017-247755 filed on Dec. 25, 2017 including the specification, drawings and abstract is incorporated herein by reference in its entirety.

BACKGROUND

The present disclosure relates to a semiconductor device and more particularly to a semiconductor device configuring a virtual machine.

A virtualization technology causes one piece of hardware to be assumed to be a plurality of pieces of hardware. The virtualization technology is implemented by placing management software called VMM (Virtual Machine Monitor or Virtual Machine Manager) or a hypervisor between the OS (Operating System) and the hardware (such as a processor or I/O) (Japanese Unexamined Patent Application Publication No. 2013-210962). For example, the VMM uses a scheduler function to periodically switch a plurality of virtual machines so that the virtual machine is executed.

Patent Literature 1: Japanese Unexamined Patent Application Publication No. 2013-210962

Patent Literature 2: Japanese Translation of Unexamined PCT Appln. No. 2013-519169

SUMMARY

When an active virtual machine is allowed to accept an interrupt, an inactive virtual machine delays responding to an interrupt because the inactive virtual machine cannot accept an interrupt until the execution switches from the active virtual machine to the inactive virtual machine. When the VMM is allowed to accept an interrupt, the active virtual machine delays responding to an interrupt because no interrupt is accepted until the execution switches from the active virtual machine to the VMM. These and other issues and novel features may be readily ascertained by referring to the following description of the present disclosure and appended drawings.

The following description concisely explains an overview of representative aspects according to the present disclosure. A semiconductor device includes a memory to store a plurality of virtual machines and a virtual machine manager to manage the virtual machines and a CPU to perform the virtual machines and the virtual machine manager. The CPU causes an active virtual machine to perform an interrupt process when information (first information) about an interrupt-processing virtual machine is equal to information (second information) about the active virtual machine. When the first information differs from the second information, the CPU causes the virtual machine manager to stop the active virtual machine and operates the interrupt-processing virtual machine to perform an interrupt process.

The above-mentioned semiconductor device can improve an interrupt capability of the virtual machine.

BRIEF DESCRIPTION OF THE DRAWINGS

FIG. 8 is a block diagram illustrating ascertainment of information about an interrupt-processing VM according to a first modification;

FIG. 9 illustrates a VM information table in FIG. 8;

DETAILED DESCRIPTION

Figure 1:
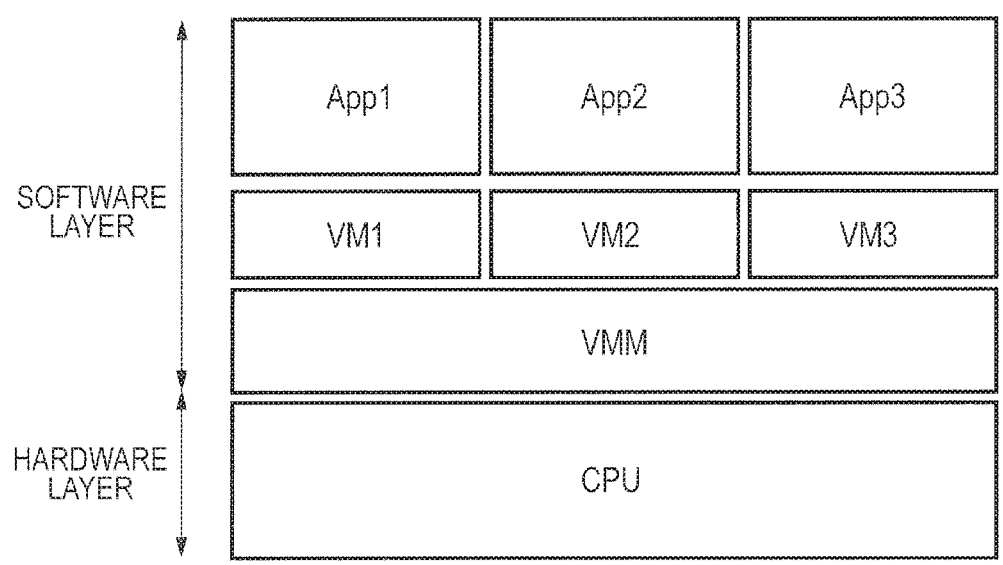
FIG. 1 is a diagram illustrating the concept of a virtual machine.

The description below explains the embodiment with reference to the accompanying drawings. In the description below, the same constituent elements are designated by the same reference numerals and a repetitive explanation may be omitted for simplicity.

The description below explains the virtual machine with reference to FIG. 1. FIG. 1 illustrates the concept of the virtual machine.

As illustrated in FIG. 1, for example, one CPU (physical machine) includes a virtual machine manager (hereinafter referred to as VMM) comprised of a software program. A software program under control of the VMM configures a plurality of virtual machines (hereinafter referred to as VMs). FIG. 1 illustrates three VMs, namely, a first virtual machine (hereinafter referred to as VM1), a second virtual machine (hereinafter referred to as VM2), and a third virtual machine (VM3). VM1, VM2, and VM3 execute corresponding application programs (App1, App2, and App3). The VMM uses a scheduler function to periodically switch VM1, VM2, and VM3 to be performed.

Figure 2A:
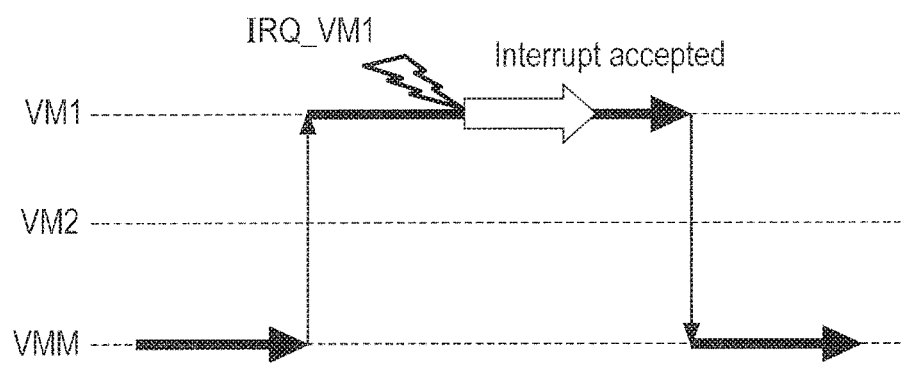
FIGS. 2A and 2B are diagrams illustrating an interrupt accepted by the virtual machine according to a first comparative example.
Figure 2B:
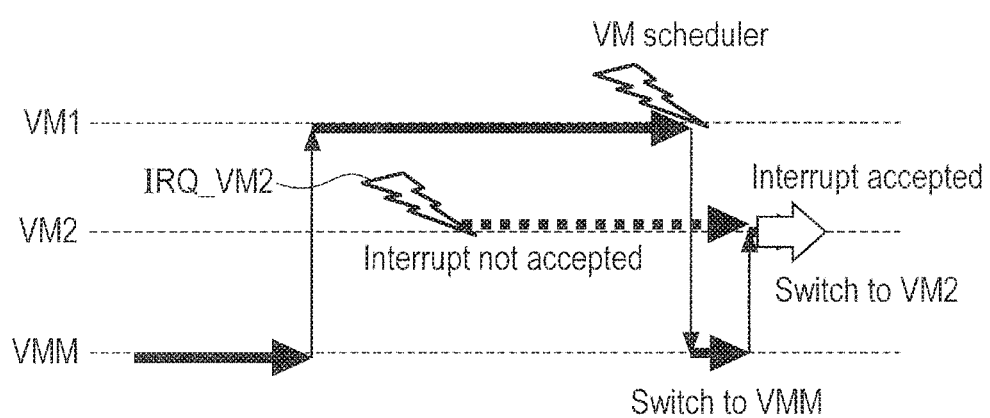

With reference to FIGS. 2A and 2B, the description below explains an example (first comparative example) of accepting an interrupt on each VM. FIGS. 2A and 2B are conceptual diagrams illustrating the interrupt acceptance according to the first comparative example. FIG. 2A is a diagram illustrating an interrupt request issued to VM1 during operation of VM1. FIG. 2B is a diagram illustrating an interrupt request issued to VM2 during operation of VM1. In FIGS. 2A and 2B, a horizontal black thick arrow represents operation in process (in execution). A vertical thin arrow represents switching the VM or the VMM. The same applies to FIGS. 3A, 3B, 4A, and 4B.

According to the first comparative example as illustrated in FIG. 2A, VM1 can accept an interrupt when an interrupt request is issued to VM1 during operation of VM1. However, VM2 cannot accept an interrupt when an interrupt request is issued to VM2 during operation of VM1. According to the first comparative example as illustrated in FIG. 2B, the VMM switches VM1 to the VMM according to the scheduler and then to VM2, starting operation of VM2. Only after that, VM2 can accept an interrupt.

Figure 3A:
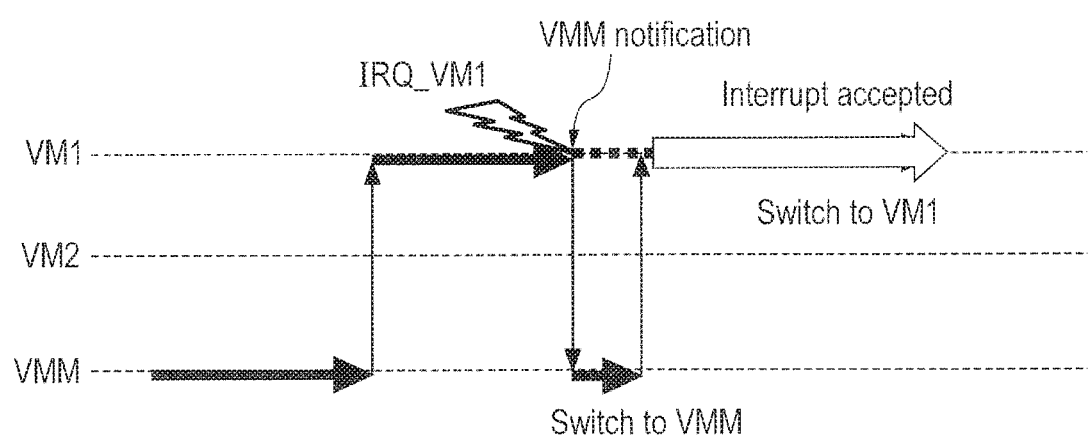
FIGS. 3A and 3B are diagrams illustrating an interrupt accepted by the virtual machine according to a second comparative example.
Figure 3B:
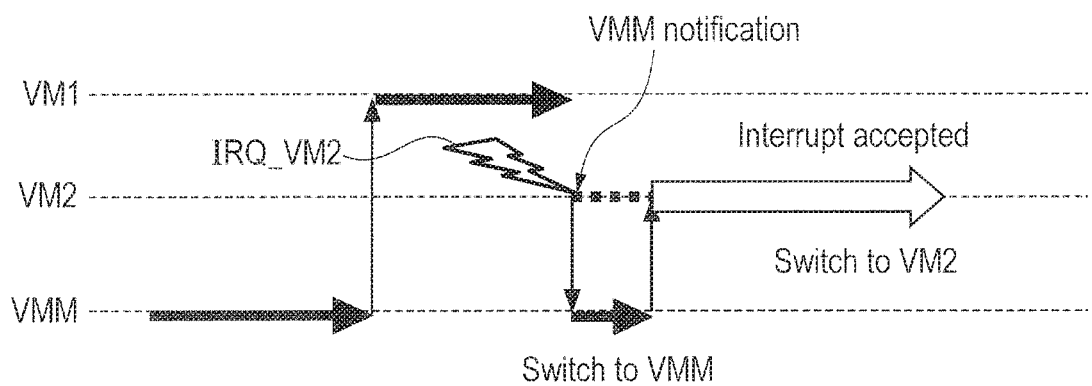

With reference to FIGS. 3A and 3B, the description below explains an example (second comparative example) of accepting an interrupt on the VMM. FIGS. 3A and 3B are conceptual diagrams illustrating the interrupt acceptance according to the second comparative example. FIG. 3A is a diagram illustrating an interrupt request issued to VM1 during operation of VM1. FIG. 3B is a diagram illustrating an interrupt request issued to VM2 during operation of VM1.

According to the second comparative example as illustrated in FIG. 3A, the VMM is notified of an interrupt request issued to VM1 during operation of VM1. The VMM switches VM1 to the VMM and then to VM1, starting operation of VM1. Only after that, VM1 can accept an interrupt. According to the second comparative example as illustrated in FIG. 3B, the VMM is notified of an interrupt request issued to VM2 during operation of VM1. The VMM switches VM1 to the VMM and then to VM2, starting operation of VM2. Only after that, VM2 can accept an interrupt.

According to the first comparative example, an active VM can directly accept an interrupt and can ensure the interrupt capability compared to the second comparative example that once allows the VMM to accept an interrupt. When an inactive VM is interrupted, however, an occurrence state is recorded in the memory. The VMM, when scheduled, reads the state. By scheduling the VM, the interrupt is processed. According to the first comparative example, the responsiveness of the inactive VM to accept an interrupt depends on a VM scheduling cycle. The first comparative example is inappropriate to ensure the real-time capability of VM interrupts.

The second comparative example allows the VMM to accept all interrupts. The inactive VM can accept interrupts while ensuring the real-time capability compared to the VM scheduling cycle. However, the active VM degrades the interrupt performance because interrupts are always accepted through the intermediation of the VMM.

Figure 4A:
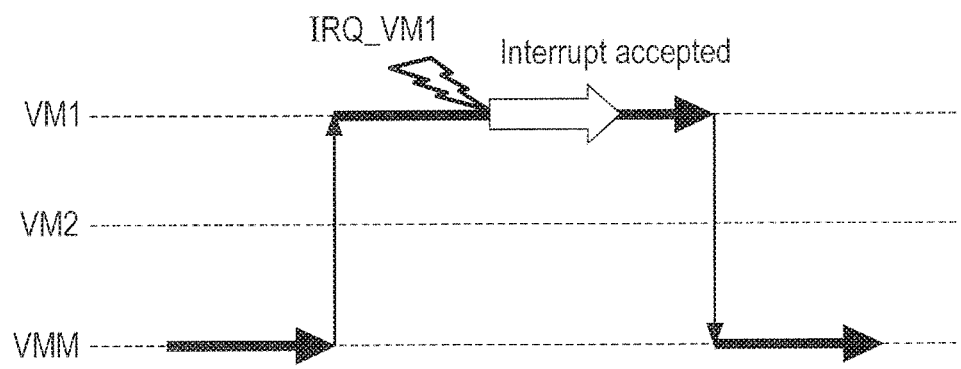
FIGS. 4A and 4B are diagrams illustrating an interrupt accepted by the virtual machine according to an embodiment.
Figure 4B:
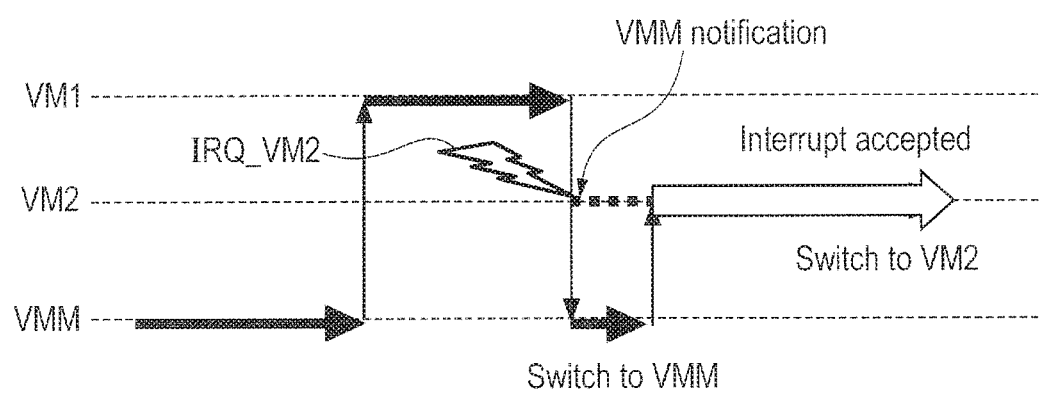

With reference to FIGS. 4A and 4B, the description below explains the interrupt acceptance according to the embodiment. FIGS. 4A and 4B are conceptual diagrams illustrating the interrupt acceptance according to the embodiment. FIG. 4A is a diagram illustrating an interrupt request issued to VM1 during operation of VM1. FIG. 4B is a diagram illustrating an interrupt request issued to VM2 during operation of VM1.

According to the embodiment as illustrated in FIG. 4A, VM1 can accept an interrupt when an interrupt request is issued to VM1 during operation of VM1. According to the embodiment as illustrated in FIG. 4B, the VMM is notified of an interrupt request issued to VM2 during operation of VM1. The VMM switches VM1 to the VMM and then to VM2, starting operation of VM2. Only after that, VM2 can accept an interrupt.

The active VM directly accepts an interrupt when the interrupt is input to a VM same as the active VM. The VMM is started when an interrupt is input to a VM different from the active VM. The VMM switches the process to the VM to which the interrupt request was issued. The interrupt is thereby accepted.

In other words, the CPU receives an interrupt to the active VM and then allows the active VM to accept the interrupt. The CPU receives an interrupt to an inactive virtual machine and then allows the VMM to accept the interrupt.

Specifically, the semiconductor device according to the embodiment includes a memory to store a plurality of VMs and the VMM and a CPU to perform the VMs and the VMM. The CPU performs an interrupt process based on information (first information) about a VM targeted at the interrupt process and information (second information) about the active VM. Namely, the CPU allows the active VM to perform the interrupt process when the information about the VM targeted at the interrupt process is equal to the information about the active VM. The CPU allows the VMM to switch the active VM and then allows the active VM to perform the interrupt process when the information about the VM targeted at the interrupt process differs from the information about the active VM.

The active VM itself can accept an interrupt when the information about the VM to process the interrupt is equal to the information about the active VM. It is possible to ensure the interrupt performance compared to the technique (second comparative example) that once allows the VMM to accept an interrupt. Moreover, the VMM can accept an interrupt even when the information about the VM to process the interrupt differs from the information about the active VM. It is possible to ensure the real-time capability of interrupts compared to the technique (first comparative example) that accepts interrupts at the VM scheduling cycle.

WORKING EXAMPLE

Figure 5:
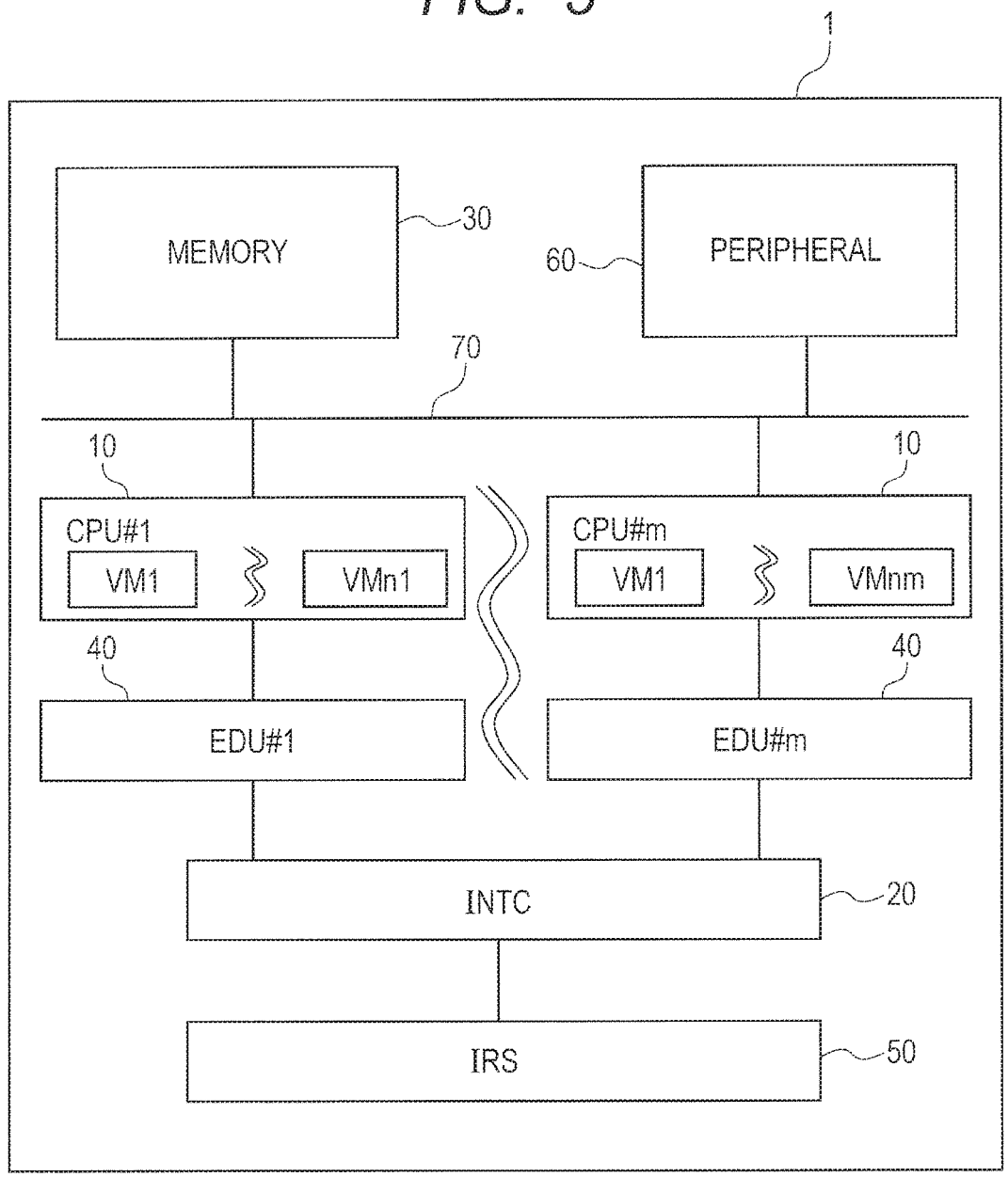
FIG. 5 is a block diagram illustrating a configuration of the semiconductor device according to the working example.

With reference to FIG. 5, the description below explains a configuration of the above-mentioned embodiment. FIG. 5 is a block diagram illustrating a configuration of the semiconductor device according to the working example.

A semiconductor device 1 includes a CPU 10, an interrupt requester (IRS) 50, an interrupt controller (INTC) 20, and a memory 30. The CPU 10 performs a plurality of VMs. The interrupt requester 50 generates an interrupt request. The interrupt controller 20 receives an interrupt request from the interrupt requester 50 and outputs the interrupt request to the CPU 10. The memory 30 stores a software program for the VMs and the VMM. The semiconductor device 1 further includes an event determination unit (EDU) 40, a peripheral unit (PERIPHERAL) 60, and a bus 70. The event determination unit 40 determines the behavior of the CPU 10 concerning interrupts based on the information about the interrupt-processing VM and the information about the active VM. The bus 70 connects among the CPU 10, the memory 30, and the peripheral unit 60. The semiconductor device 1 is provided as a microcontroller comprised of a single semiconductor chip. One or more CPUs 10 may be available. The event determination unit 40 is provided correspondingly to the CPU 10. When the number of CPUs 10 is m (CPUs #1 through m), the number of event determination units 40 is also m (event determination units #1 through m). The first CPU 10 (CPU #1) performs as many as n1 VMs out of VM1 through VMn1. The mth CPU 10 (CPU #m) performs as many as nm VMs out of VM1 through VMnm. It is supposed that n1 and nm are natural numbers and n1 may or may not be equal to nm.

FIG. 5 illustrates one memory 30 but a plurality of memories may be used. The memory 30 may not be directly connected to the bus 70 if there is an access path from the CPU 10. The memory 30 may be available as a volatile memory such as SRAM or as a non-volatile memory such as a flash memory. While one interrupt controller 20 is provided, there may be a plurality of interrupt controllers each of which corresponds to the CPU. While all the CPUs 10 can perform a plurality of VMs as described, there may be a mix of a CPU performing only one VM and a CPU having no VM. The event determination unit 40 may be included in the CPU 10 or the interrupt controller 20. In FIG. 5, the interrupt requester 50 represents one or more peripheral units or external terminals.

Figure 6:
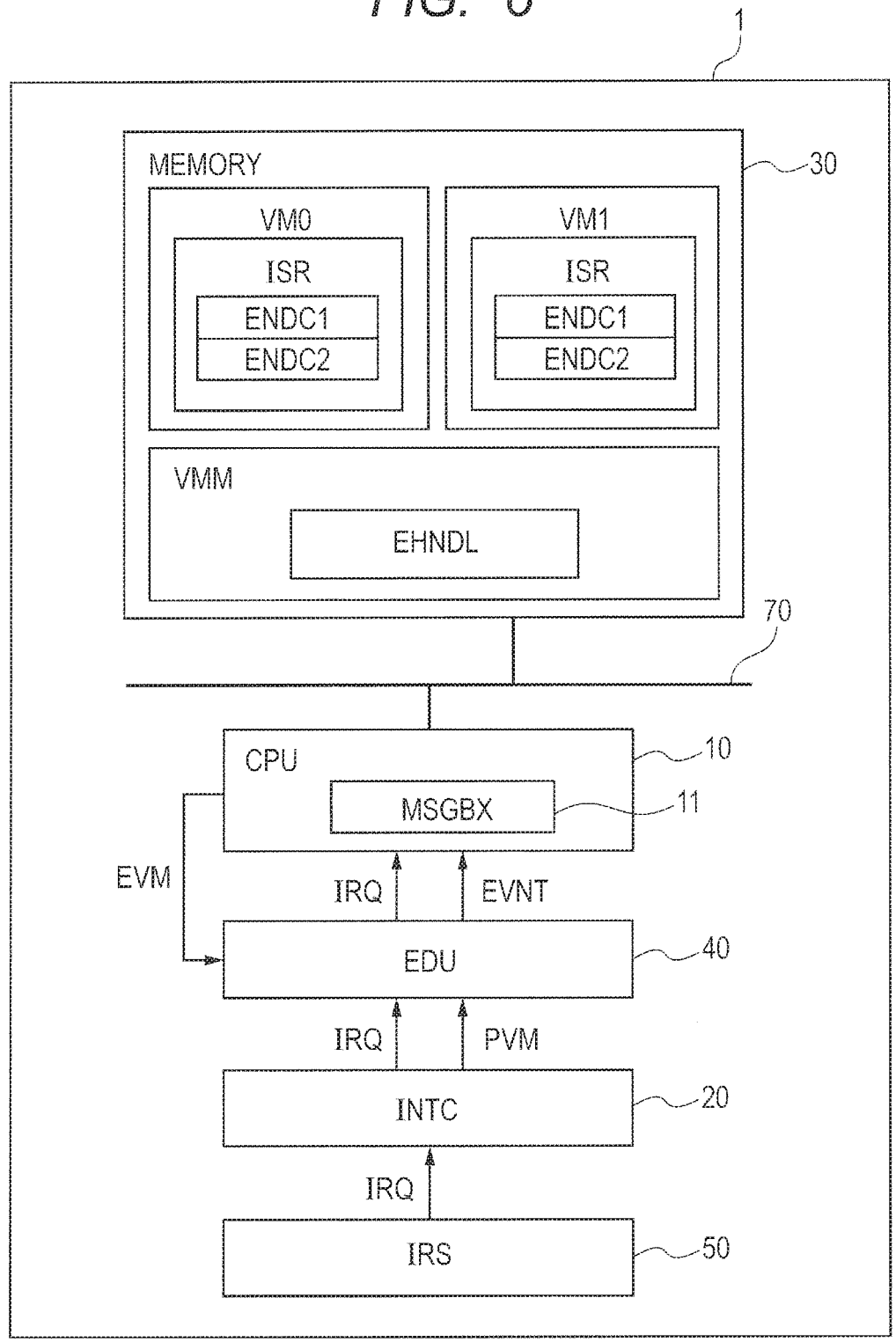
FIG. 6 illustrates one CPU and one event determination unit of the semiconductor device in FIG. 5.

FIG. 6 illustrates one CPU and one event determination unit of the semiconductor device in FIG. 5.

The following description assumes that one CPU 10 and one event determination unit 40 are used and two VMs are operating on the CPU 10. However, the number of VMs is not limited to two.

The memory 30 stores software programs for VM1, VM2, and the VMM. The program for VM1 and VM2 includes an interrupt subroutine (hereinafter referred to as an ISR). The program for the VMM includes an exception handler (EHNDL). The ISR includes a first end code (ENDC1) and a second end code (ENDC2) to branch to a return destination of the subroutine. The CPU 10 is assigned the software program for one of VM1, VM2, and the VMM. The VMM performs assignment of VM1 and VM2. The CPU 10 is comprised of a register and includes a message box (MSGBX) 11 to perform communication among the VMM, VM1, and VM2. The VMM can read and write to the message box 11 and the VM can read from the same. According to the working example, the message box 11 is comprised of a register and is placed in the CPU 10. However, the message box 11 can be provided as a storage accessible from the CPU and may be placed in the memory 30 or the peripheral unit 60 connected with the bus 70, for example.

When an interrupt is notified from the interrupt requester 50, the interrupt controller 20 settles information (PVM) about the VM to process the interrupt based on the interrupt information (such as an interrupt channel number).

Figure 7:
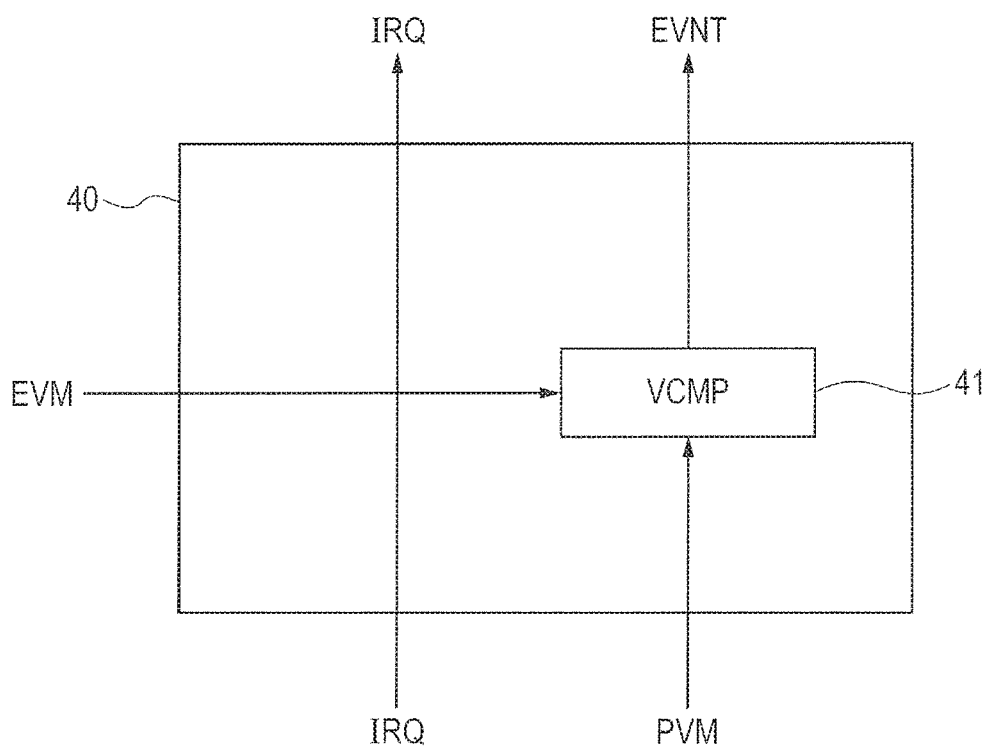
FIG. 7 is a block diagram illustrating a configuration of the event determination unit in FIG. 6.

With reference to FIG. 7, the description below explains an example of the event determination unit. FIG. 7 is a block diagram illustrating a configuration of the event determination unit in FIG. 6. The event determination unit 40 allows a VM comparison circuit (VCMP) 41 to determine whether information (EVM) about the active VM matches information (PVM) about an interrupt-processing VM. The event determination unit 40 outputs match information (match determination result) and the information (PVM) about the interrupt-processing VM as an event instruction (EVNT) to the CPU 10.

The CPU 10 receives an interrupt request (IRQ) and the event instruction (EVNT) and settles the behavior according to the event instruction (EVNT). When the match determination result included in the event instruction (EVNT) represents a match, the CPU 10 reads the ISR for the interrupt-processing VM from the memory 30 and performs the interrupt process. The ISR reads the message box 11. In this case, the VMM stores an instruction to select the first end code (ENDC1) in the message box 11. For example, the VMM previously stores an instruction to select the first end code (ENDC1) by default. The ISR executes the first end code (ENDC1) according to the instruction in the message box 11. The first end code (ENDC1) includes a branch to restore a process before interrupted by the ISR and is executed to complete the interrupt process.

When the match determination result included in the event instruction (EVNT) represents a mismatch, the CPU 10 reads the exception handler (EHNDL) for the VMM from the memory 30. The exception handler (EHNDL) includes a program to switch VMs. The VMM assigns the interrupt-processing VM to the CPU 10. The VM assigned to the CPU 10 accepts an interrupt request and reads its ISR from the memory 30 to perform the interrupt process. The ISR reads the message box 11. In this case, the VMM stores an instruction to select the second end code (ENDC2) in the message box 11. For example, the VMM stores an instruction to select the second end code (ENDC2) in the message box 11 before switching the VM. The ISR executes the second end code (ENDC2). The second end code (ENDC2) includes a process allowing the CPU 10 to perform the VMM and is executed to operate the VMM. The VMM performs a specified termination process. For example, the VMM stores an instruction to select the first end code (ENDC1) in the message box 11 and assigns the CPU 10 the VM performed before the interrupt request was input.

The description below specifically explains an example where the CPU 10 performs VM1. The interrupt controller 20 ascertains the information (PVM) about the interrupt-processing VM based on the input interrupt request.

The match determination result from the event determination unit 40 represents a match when the information (PVM) about the interrupt-processing VM corresponds to VM1. VM1 as the match information and the information (PVM) about the interrupt-processing VM is output as the event instruction (EVNT). The CPU 10 follows the event instruction (EVNT) and reads the ISR for VM1 from the memory 30 to perform the interrupt process. The ISR reads the message box 11. In this case, the VMM stores an instruction to select the first end code (ENDC1) in the message box 11. The ISR executes the first end code (ENDC1) according to the instruction in the message box 11 and returns to the process before the interrupt.

The match determination result from the event determination unit 40 represents a mismatch when the information (PVM) about the interrupt-processing VM corresponds to VM2. VM2 as the match information (mismatch information) and the information (PVM) about the interrupt-processing VM is output as the event instruction (EVNT). The CPU 10 follows the event instruction (EVNT) and reads the exception handler (EHNDL) for the VMM from the memory 30. The VMM stores an instruction to select the second end code (ENDC2) in the message box 11 and assigns VM2 to the CPU 10. The CPU 10 reads the ISR for VM2 from the memory 30 and performs the interrupt process. The ISR reads the message box 11. In this case, the VMM stores an instruction to select the second end code (ENDC2) in the message box 11. The ISR executes the second end code (ENDC2) according to the instruction in the message box 11 and assigns the VMM to the CPU 10. The VMM stores an instruction to select the first end code (ENDC1) in the message box 11 and assigns VM1 to the CPU 10.

According to the working example, the active VM itself in the foreground can accept interrupts, making it possible to ensure the interrupt performance compared to the technique (second comparative example) that once allows the VMM to accept an interrupt. Even when a VM other than the interrupt destination is performed, the VMM can accept interrupts, making it possible to ensure the real-time capability of interrupts compared to the technique (first comparative example) that accepts interrupts at the VM scheduling cycle.

Modifications

Representative modifications are described below. The following description of the modifications assumes that the same reference symbols as used for the above-mentioned working example can be used for the parts including the configuration and the function similar to those explained in the above-mentioned working example. The description of the above-mentioned working example is applicable to the description of those parts as needed within a technologically undeviating scope. Parts of the above-mentioned working example and all or part of the modifications are interchangeably applicable as needed within a technologically undeviating scope.

First Modification

According to the working example, an interrupt is notified from the interrupt requester 50 such as the peripheral unit 60 or an outside of the chip. The interrupt controller 20 then ascertains the information (PVM) about the VM to process the interrupt based on the interrupt information (such as an interrupt channel number) but is not limited thereto.

With reference to FIGS. 8 and 9, the description below explains ascertainment of information (PVM) about an interrupt-processing VM according to the first modification. FIG. 8 is a block diagram illustrating ascertainment of information about the interrupt-processing VM according to the first modification. FIG. 9 illustrates a VM information table in FIG. 8.

The first modification ascertains the information (PVM) about the interrupt-processing VM by using an interrupt controller 20A and a VM information table (VMT) 80. The interrupt controller 20A maintains attribute information (AI) for each type of input interrupts. The VM information table (VMT) 80 ascertains the relation between the attribute information (AI) and the information (PVM) about the interrupt-processing VM. As illustrated in FIG. 9, the VM information table 80 ascertains the information (PVM) about the interrupt-processing VM based on values corresponding to the attribute information (AI). In FIG. 9, "0" and "2" of the attribute information (AI) specify VM1 as the information (PVM) about the interrupt-processing VM and "1" and "3" of the attribute information (AI) specify VM2 as the information (PVM) about the interrupt-processing VM. The example in FIG. 9 provides one VM corresponding to a value of the attribute information (AI) but is not limited thereto. A plurality of VMs may be specified. The VM information table (VMT) 80 may be placed inside the event determination unit 40.

Second Modification

The event determination unit 40 according to the working example is simply configured. However, VMs are inevitably switched if the active VM differs from the interrupt-requesting VM. An overhead occurs by switching VMs each time an interrupt request occurs. A process essentially submitted to the CPU 10 may not be performed. Actually, all interrupts are not critical and need not be performed at the cost of switching the active VM.

Figure 10:
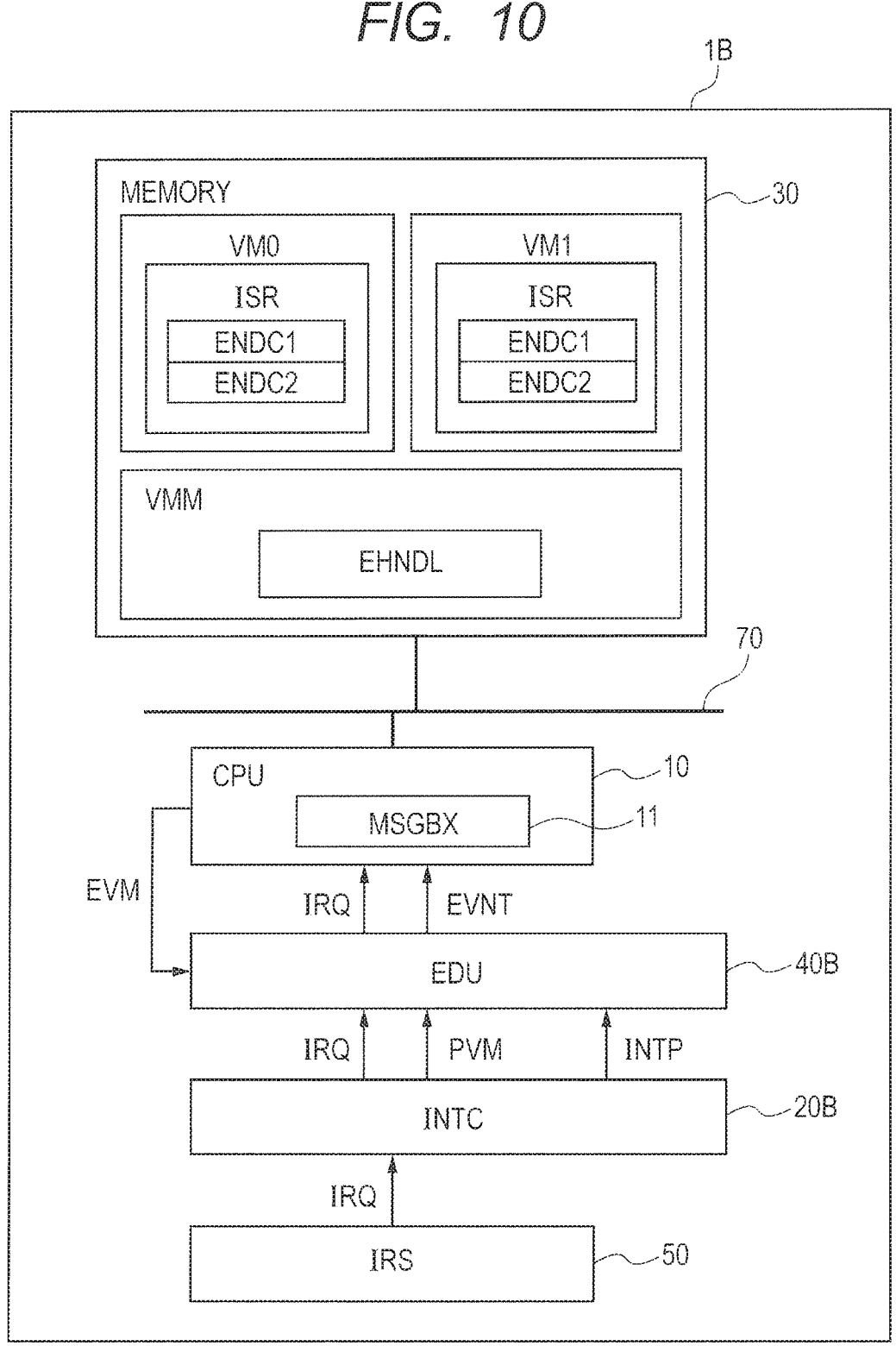
FIG. 10 is a block diagram illustrating a configuration of the semiconductor device according to a second modification.
Figure 11:
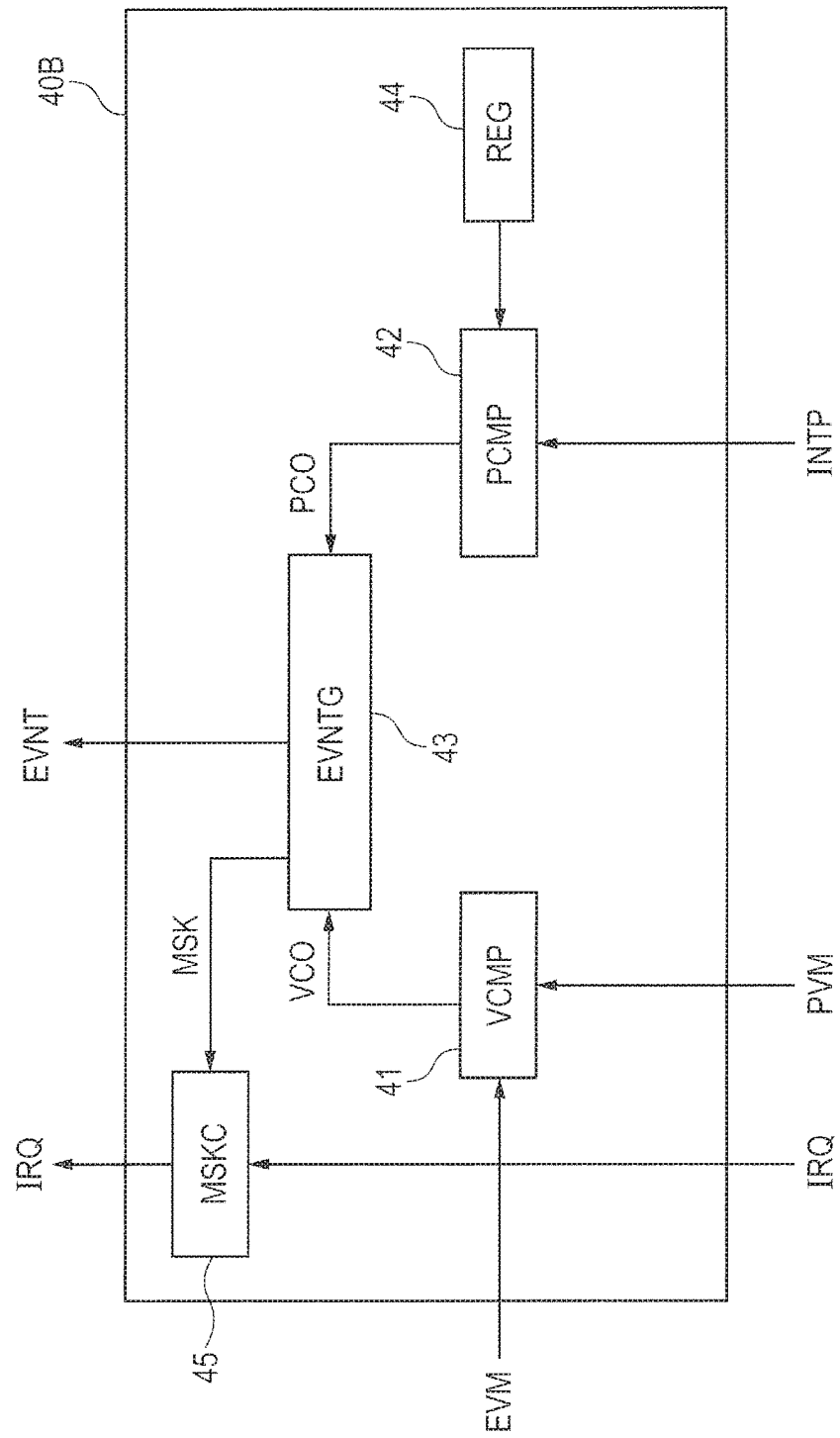
FIG. 11 is a block diagram illustrating a configuration of an event determination unit in FIG. 10.

The second modification can select whether to switch VMs according to types of interrupts. The description below explains FIGS. 10 and 11 concerning the event determination unit according to the second modification. FIG. 10 is a block diagram illustrating a configuration of the semiconductor device according to the second modification. FIG. 11 is a block diagram illustrating a configuration of the event determination unit in FIG. 10.

A semiconductor device 1B according to the second modification is equal to the semiconductor device 1 according to the working example except an interrupt controller 20B and an event determination unit 40B.

An interrupt priority (INTP) is output from the interrupt controller 20B and is input to the event determination unit 40B. The event determination unit 40B includes a register (REG) 44, a priority comparison circuit (PCMP) 42, and a VM comparison circuit (VCMP) 41. The register (REG) 44 stores a threshold value (TH) indicating whether the interrupt is higher than or equal to a specified priority. The priority comparison circuit (PCMP) 42 compares the threshold value (TH) with the interrupt priority (INTP). The VM comparison circuit (VCMP) 41 compares the information (EVM) about the active VM with the information (PVM) about the interrupt-processing VM. The event determination unit 40B further includes an event instruction generation circuit (EVNTG) 43 and a mask circuit (MSKC) 45. The event instruction generation circuit (EVNTG) 43 generates an event instruction (EVNT) from a priority comparison result (PCO) of the priority comparison circuit 42 and a comparison result (VCO) of the VM comparison circuit 41. The mask circuit (MSKC) 45 permits or inhibits transmission of an interrupt request (IRQ) to the CPU 10. The comparison result (VCO) provides the match determination result and the information (PVM) about the interrupt-processing VM. The event instruction (EVNT) provides the event instruction generation result (availability of VM switching) and the information (PVM) about the interrupt-processing VM. The threshold value (TH) may be settled to the register 44 from the CPU 10 by using a software program or may be fixed to the hardware. The register 44 to store the threshold value (TH) may include a mechanism to limit settings from the VM when the threshold value (TH) can be settled from a software program.

The second modification generates the priority comparison result (PCO) from the interrupt priority (INTP) and the threshold value (TH). The priority comparison result (PCO) includes an output indicating whether the interrupt priority (INTP) is greater than the threshold value (TH), for example. The event instruction generation circuit 43 generates an event instruction (EVNT) from the comparison result (VCO) of the VM comparison circuit (VCMP) 41 and the priority comparison result (PCO) of the priority comparison circuit 42. For example, when the comparison result (VCO) of the VM comparison circuit 41 shows a mismatch and the interrupt priority (INTP) is greater than the threshold value (TH), the event instruction generation circuit 43 generates an event instruction (EVNT) to switch the VM and generates a signal (MSK) so as to permit output of the interrupt request (IRQ) to the CPU 10. When the result of the VM comparison circuit 41 shows a mismatch and the interrupt priority (INTP) is smaller than or equal to the threshold value (TH), the event instruction generation circuit 43 generates a signal (MSK) so as not to output the interrupt request (IRQ) to the CPU 10.

For example, when the comparison result (VCO) of the VM comparison circuit 41 shows a match, the event instruction generation circuit 43 generates an event instruction (EVNT) so as not to switch the VM and generates a signal (MSK) to permit output of the interrupt request (IRQ) to the CPU 10.

The second modification uses the interrupt priority (INTP) and the threshold value (TH) as the condition of switching VMs but is not limited thereto. For example, the interrupt controller 20 may include a capability to provide a setting to determine whether to permit each channel for interrupts to enable the VM switching. The setting may be output to the event determination unit to generate an event instruction.

The working example inevitably causes VM switching if the active VM differs from the interrupt-requesting VM. An overhead occurs by switching VMs each time an interrupt request (IRQ) occurs. A process essentially submitted to the CPU 10 may not be performed. The second modification selects the availability of VM switching based on interrupt types and thereby switches VMs limited to the interrupt request (IRQ) needed to be executed at the cost of stopping the operation of the active VM. It is therefore possible to prevent the occurrence of an excess overhead and improve the interrupt process performance. An interrupt requiring no VM switching need not select the second end code (ENDC2). The ISR may be configured to execute the first end code (ENDC1) without reading the message box 11.

Third Modification

According to the second modification, the CPU 10 does not accept the highest-priority interrupt when the comparison result (VCO) of the VM comparison circuit 41 shows a mismatch and the interrupt priority (INTP) is smaller than or equal to the threshold value (TH). However, a lower-priority interrupt may be suspended because the interrupt priority (INTP) is smaller than or equal to a threshold value (VH) even when comparison result (VCO) of the VM comparison circuit 41 shows a match.

Figure 12:
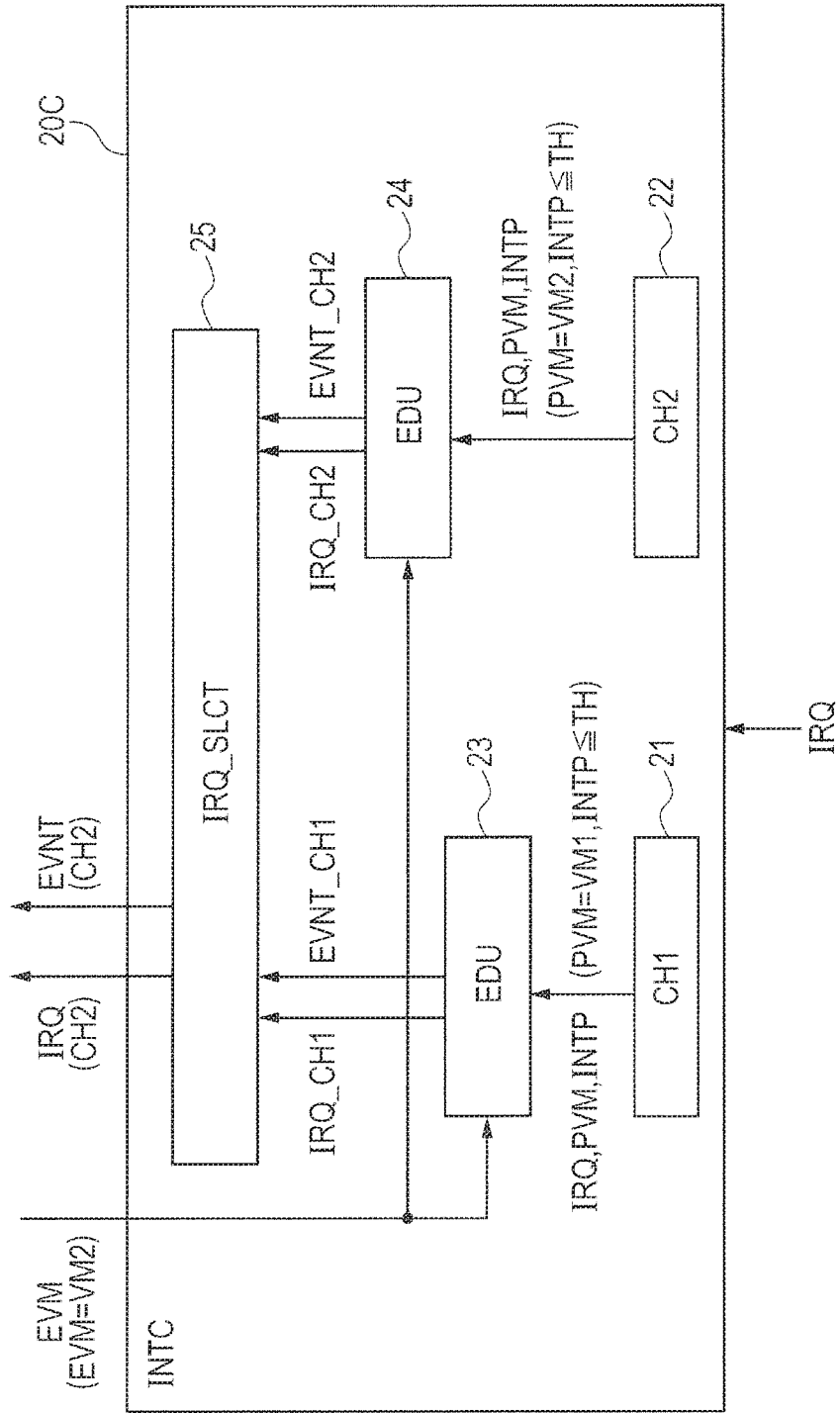
FIG. 12 is a block diagram illustrating a configuration of an interrupt controller according to a third modification.
Figure 13:
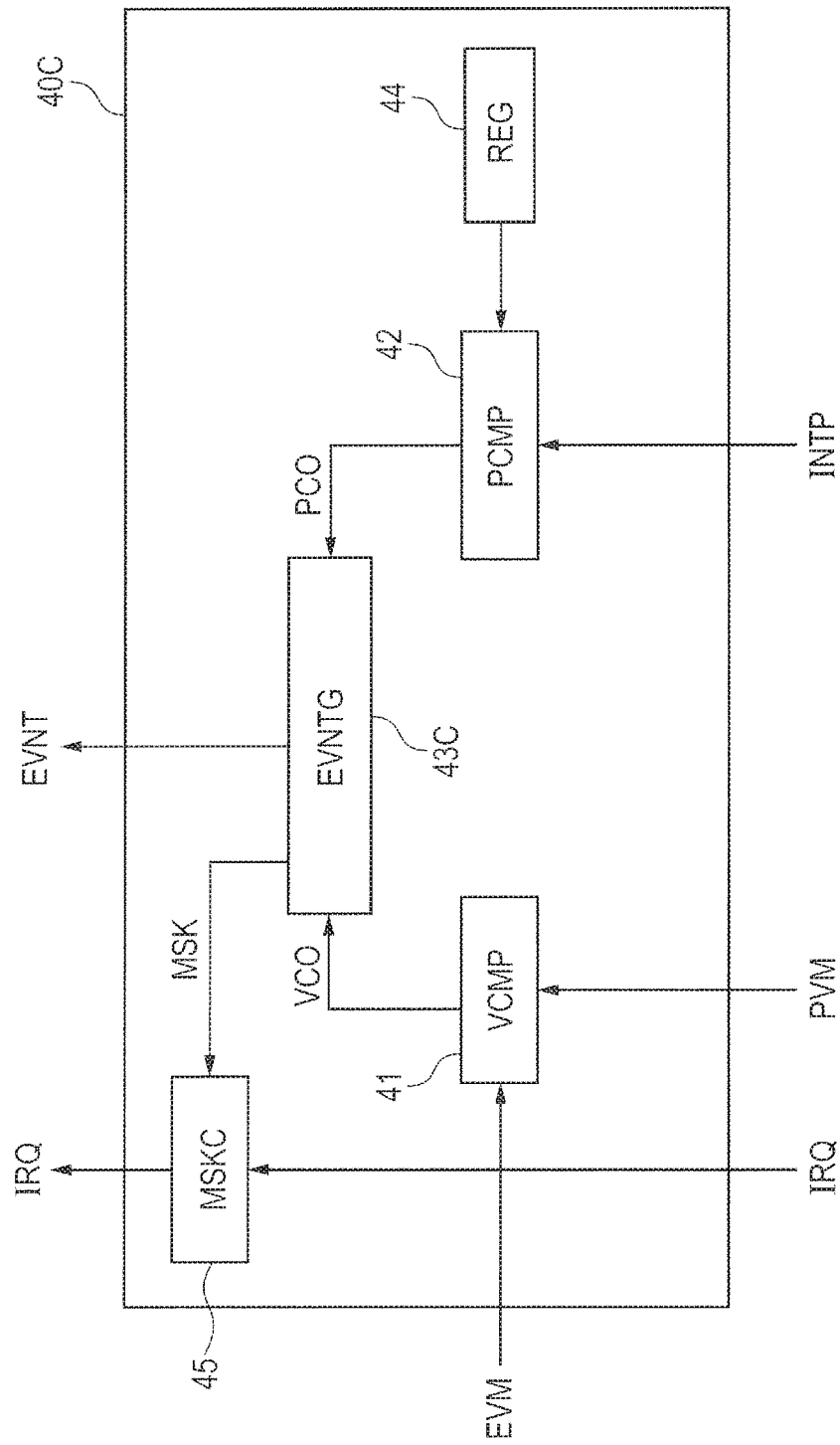
FIG. 13 is a block diagram illustrating a configuration of an event determination unit in FIG. 12.

An example (third modification) of solving this will be described with reference to FIGS. 12 and 13. FIG. 12 is a block diagram illustrating a configuration of an interrupt controller according to the third modification. FIG. 13 is a block diagram illustrating a configuration of an event determination unit in FIG. 12.

A semiconductor device according to the third modification is equal to the semiconductor device 1B according to the second modification except that the event determination unit is provided inside an interrupt controller 20C. The interrupt controller 20C includes the priority comparison circuit to be supplied with the information (EVM) about the active VM. The interrupt priority (INTP) and the threshold value (TH) are compared in response to each interrupt request (IRQ) inside the interrupt controller 20C. The interrupt request (IRQ) for the active VM is output when there is no interrupt corresponding to the interrupt priority (INTP) greater than the threshold value (TH).

Specifically, the interrupt controller 20C includes an event determination unit 23 corresponding to an interrupt requester 21 for a first channel, an event determination unit 24 corresponding to an interrupt requester 22 for a second channel, and an interrupt selection circuit (IRQ_SLCT) 25. The interrupt requester 21 for the first channel outputs an interrupt request (IRQ), the information (PVM) about the interrupt-processing VM, and an interrupt priority (INTP) to the event determination unit 23. The interrupt requester 22 for the second channel outputs an interrupt request (IRQ), the information (PVM) about the interrupt-processing VM, and an interrupt priority (INTP) to the event determination unit 24.

Similarly to the event determination unit 40B according to the second modification, the event determination units 23 and 24 each include a register (REG) 44, a priority comparison circuit (PCMP) 42, and a VM comparison circuit (VCMP) 41. The register (REG) 44 stores a threshold value (TH) indicating whether the interrupt is higher than or equal to a specified priority. The priority comparison circuit (PCMP) 42 compares the threshold value (TH) with the interrupt priority (INTP). The VM comparison circuit (VCMP) 41 compares the information (EVM) about the active VM with the information (PVM) about the interrupt-processing VM. Moreover, the event determination units 23 and 24 each include an event instruction generation circuit (EVNTG) 43C and a mask circuit (MSKC) 45. The event instruction generation circuit (EVNTG) 43 generates an event instruction (EVNT) from a priority comparison result (PCO) of the priority comparison circuit 42 and a comparison result (VCO) of the VM comparison circuit 41. The mask circuit (MSKC) 45 permits or inhibits transmission of an interrupt request (IRQ) to the CPU 10. The comparison result (VCO) provides the match determination result and the information (PVM) about the interrupt-processing VM. The event instruction (EVNT) provides the event instruction generation result (availability of VM switching and an interrupt priority smaller than or equal to the threshold value) and the information (PVM) about the interrupt-processing VM.

The event instruction generation circuit 43C generates an event instruction (EVNT) from the comparison result (VCO) of the VM comparison circuit (VCMP) 41 and the priority comparison result (PCO) of the priority comparison circuit 42. For example, when the comparison result (VCO) of the VM comparison circuit 41 shows a mismatch and the interrupt priority (INTP) is greater than the threshold value (TH), the event instruction generation circuit 43C generates an event instruction (EVNT) to switch the VM and generates a signal (MSK) so as to permit output of the interrupt request (IRQ) to the CPU 10. When the result of the VM comparison circuit 41 shows a mismatch and the interrupt priority (INTP) is smaller than or equal to the threshold value (TH), the event instruction generation circuit 43C generates a signal (MSK) so as not to output the interrupt request (IRQ) to the CPU 10.

For example, when the comparison result (VCO) of the VM comparison circuit 41 shows a match and the interrupt priority (INTP) is greater than the threshold value (TH), the event instruction generation circuit 43C generates an event instruction (EVNT) so as not to switch the VM and generates a signal (MSK) to permit output of the interrupt request (IRQ) to the CPU 10. When the result of the VM comparison circuit 41 shows a match and the interrupt priority (INTP) is smaller than or equal to the threshold value (TH), the event instruction generation circuit 43C generates an event instruction (EVNT) indicating the interrupt priority (INTP) being smaller than or equal to the threshold value (TH) and not to switch the VM and generates a signal (MSK) to permit output of the interrupt request (IRQ) to the CPU 10.

The interrupt selection circuit 25 receives an interrupt request from the event determination units 23 and 24, namely, an interrupt request including a match in the comparison result (VCO) from the VM comparison circuit 41 or an interrupt request including a mismatch in the comparison result (VCO) from the VM comparison circuit 41 and an event instruction (EVNT) generated to switch the VM. The interrupt selection circuit 25 selects an interrupt request (IRQ) assigned the highest interrupt priority out of the received ones and outputs the interrupt request (IRQ) and the event instruction (EVNT) to the CPU 10. At this time, the event instruction (EVNT) includes the information (PVM) about the VM that processes the presence or absence of VM switching and the interrupt.

The case to be described below assumes the following. The interrupt requester 21 for the first channel outputs an interrupt request (IRQ), VM1 as the information (PVM)

about the interrupt-processing VM, and the interrupt priority (INTP) being smaller than or equal to the threshold value (TH). The interrupt requester 22 for the second channel outputs an interrupt request (IRQ), VM2 as the information (PVM) about the interrupt-processing VM, and the interrupt priority (INTP) being smaller than or equal to the threshold value (TH). The information (EVM) about the active VM is VM2.

According to the interrupt request (IRQ) from the interrupt requester 21 for the first channel, the information (PVM) about the interrupt-processing VM differs from the information (EVM) about the active VM. The interrupt priority (INTP) is smaller than or equal to the threshold value (TH). The event determination unit 23 therefore does not output the interrupt request (IRQ_CH1) and the event instruction (EVNT_CH1) to the interrupt selection circuit 25 (IRQ_CH1=0 and EVNT_CH1=0, for example).

According to the interrupt request (IRQ) from the interrupt requester 22 for the second channel, the information (PVM) about the interrupt-processing VM matches the information (EVM) about the active VM. The interrupt priority (INTP) is smaller than or equal to the threshold value (TH). The event determination unit 24 therefore outputs the interrupt request (IRQ_CH2) and the event instruction (EVNT_CH2) to the interrupt selection circuit 25. In this case, the event instruction (EVNT_CH2) indicates no VM switching. The interrupt priority is smaller than or equal to the threshold value. The information (PVM) about the interrupt-processing VM corresponds to VM2. The interrupt request is specified as IRQ_CH2=1.

The interrupt selection circuit 25 outputs the interrupt request (IRQ_CH2) and the event instruction (EVNT_CH2) from the event determination unit 24 to the CPU 10. The interrupt request (IRQ) and the event instruction (EVNT) for the second channel are therefore selected. In this case, the event instruction (EVNT) indicates no VM switching. The information (PVM) about the interrupt-processing VM corresponds to VM2. The interrupt request (IRQ) for the second channel is output to the CPU 10 even if the interrupt priority (INTP) for the first channel is higher than the interrupt priority (INTP) for the second channel. In other words, the interrupt request (IRQ) assigned a high interrupt priority (INTP), no VM switching, and the information (PVM) about the interrupt-processing VM differing from the information (EVM) about the active VM does not hinder the interrupt request (IRQ) assigned a low interrupt priority (INTP), no VM switching, and the information (PVM) about the interrupt-processing VM matching the information (EVM) about the active VM from being output to the CPU 10.

Fourth Modification

The working example can maintain the periodic control of a VM scheduler by allowing the event instruction (EVNT) to generate an exception to transition to the VMM, then executing the second end code (ENDC2), returning the process to the VMM, and assigning the VM before the interrupt to the CPU 10. However, a time window for the interrupted VM is consumed for the time to have executed the ISR.

Figure 14:
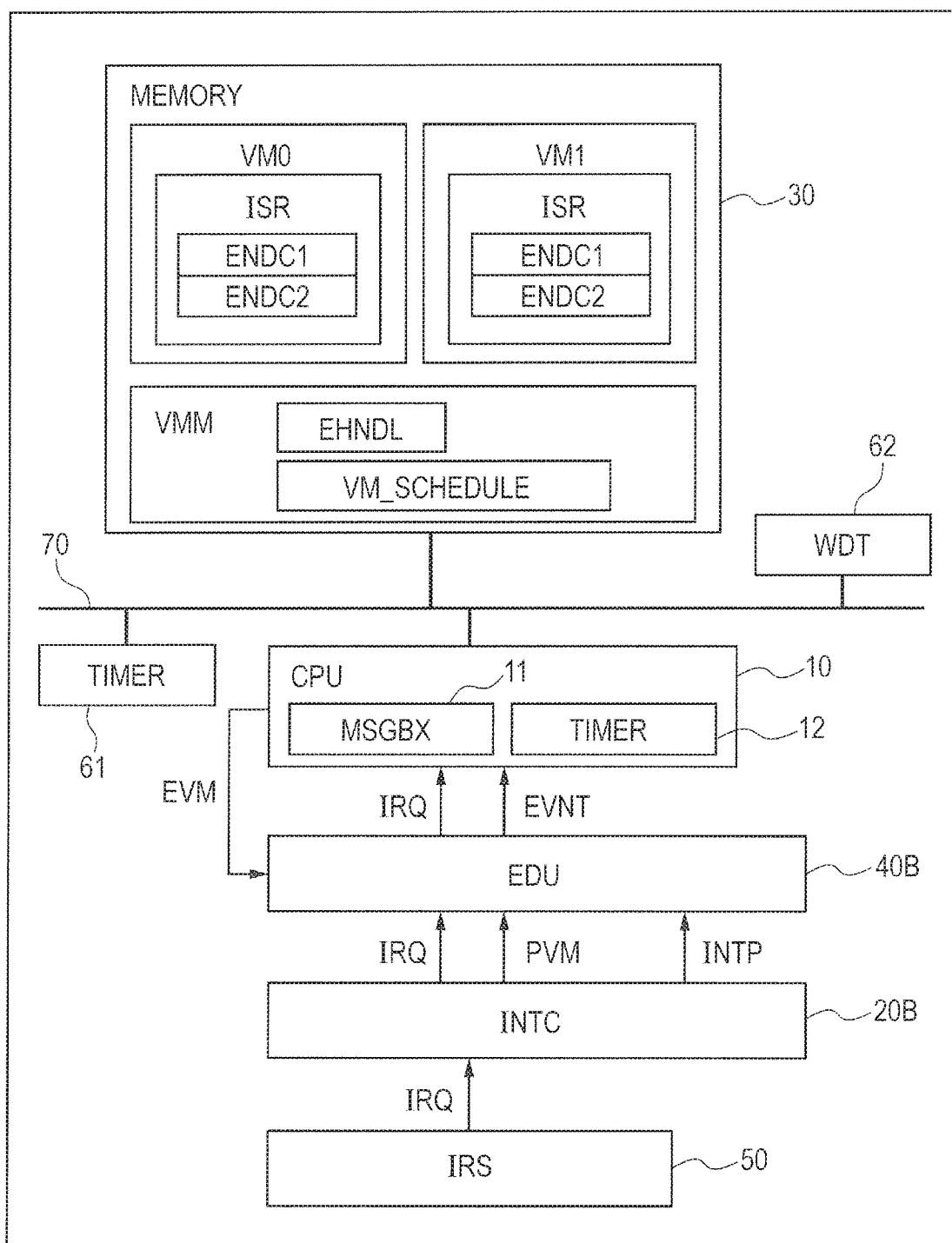
FIG. 14 is a block diagram illustrating a configuration of the semiconductor device according to a fourth modification.
Figure 15A:
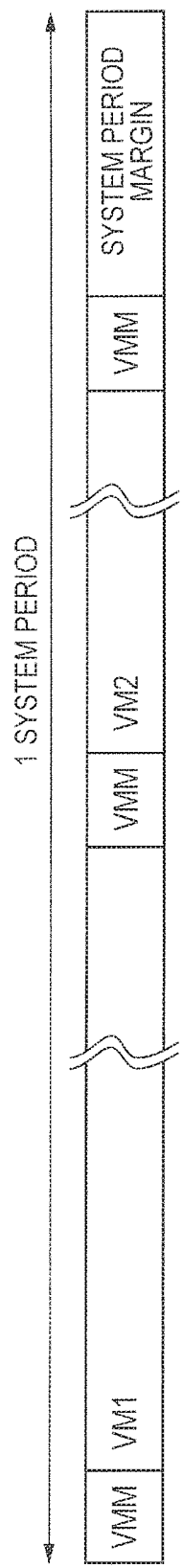
FIGS. 15A, 15B, and 15C are timing charts illustrating operation of a VMM scheduler.
Figure 15B:
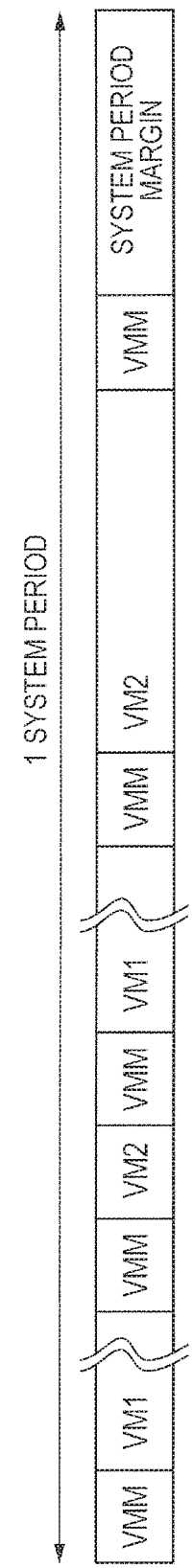
Figure 15C:
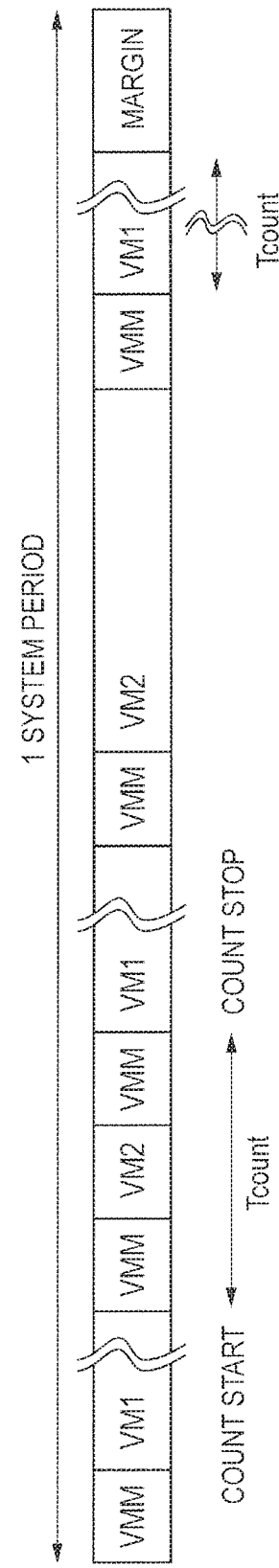

With reference to FIGS. 14 and 15A, 15B, and 15C, the description below explains the semiconductor device according to the fourth modification to solve this issue. FIG. 14 is a block diagram illustrating a configuration of the semiconductor device according to the fourth modification. FIGS. 15A, 15B, and 15C are timing charts illustrating operation of a VMM scheduler. FIG. 15A illustrates a basic operation of the VMM scheduler. FIG. 15B illustrates an operation when accepting an interrupt according to the working example. FIG. 15C illustrates an operation according to the fourth example.

Before explaining the fourth modification, the description below explains the basic operation of the VM scheduler. As illustrated in FIG. 15A, one system period (SYSTEM PERIOD) for the VM scheduler starts with the VMM operation. The operation then switches to VM1 and perform VM1. After a lapse of specified time from the start of the VM1 operation, the operation switches VM1 to the VMM, and then to VM2 to perform VM2. After a lapse of specified time from the start of the VM2 operation, VM2 switches to the VMM. A system period margin is placed at the end of one system period.

The description below explains a VM scheduler operation when an interrupt request from VM2 is accepted during operation of VM1 in the configuration of the semiconductor device according to the working example. As illustrated in FIG. 15B, one system period (SYSTEM PERIOD) for the VM scheduler starts with the VMM operation. The operation then switches to VM1 and performs VM1. To accept the interrupt request from VM2, the operation switches VM1 to the VMM, and then to VM2 to perform the interrupt process. After the interrupt process on VM2, the operation switches VM2 to the VMM, and then to VM1 to perform VM1. After a lapse of specified time from the start of the first VM1 operation, VM1 switches to the VMM, and then to VM2 to be performed. After a lapse of specified time from the start of the VM2 operation, VM2 switches to the VMM. A system period margin is placed at the end of one system period.

The fourth modification activates a performance measuring function before the VMM executes the ISR for the VM corresponding to the interrupt request. For example, the performance measuring function includes a function to count the VM execution time by using a timer (TIMER) 61 and can start the VM from the VMM and read a counter value. The performance measuring function includes a mechanism to prevent the VM from controlling the counter as needed. The VMM executes the ISR for the VM corresponding to the interrupt request and then confirms a result of the performance measuring function. For example, the time (Tcount) consumed to process the ISR for the VM corresponding to the interrupt request is provided during the system period margin at the end of one system period and the interrupted VM is performed for the time (Tcount) consumed to process the ISR for the VM corresponding to the interrupt request.

Specifically, the description below explains a VM scheduler operation when an interrupt request from VM2 is accepted during operation of VM1 in the configuration of the semiconductor device according to the fourth modification. As illustrated in FIG. 15C, one system period (SYSTEM PERIOD) for the VM scheduler starts with the VMM operation. The operation then switches to VM1 and performs VM1. To accept the interrupt request from VM2, the operation switches VM1 to the VMM, and then to VM2 to perform the interrupt process. Switching VM1 to the VMM starts counting the timer (TIMER) 61 (COUNT START). After the interrupt process on VM2, the operation switches VM2 to the VMM, and then to VM1 to perform VM1. Switching the VMM to VM1 stops counting the timer (TIMER) 61 (COUNT STOP). After a lapse of specified time from the start of the first VM1 operation, VM1 switches to the VMM, and then to VM2 to be performed. After a lapse of specified time from the start of the VM2 operation, VM2 switches to the VMM. VM1 is performed for the time (Tcount) consumed to process the ISR for the VM2 corresponding to the interrupt request during the system period margin at the end of one system period. It is therefore possible to ensure the time window for VM1 interrupted by the VMM and VM2.

The time window for the interrupted VM may be restored to an originally estimated length by adding the time (Tcount) consumed to process the ISR for the VM2 corresponding to the interrupt request to a periodic control counter (such as a timer (TIMER) 12 in the CPU 10) for the VMM scheduler. This technique extends the time to preform one cycle of the VM scheduler. However, a watchdog timer (WDT) 62 may be provided for the VM scheduler to protect the execution time.

Application

Figure 16:
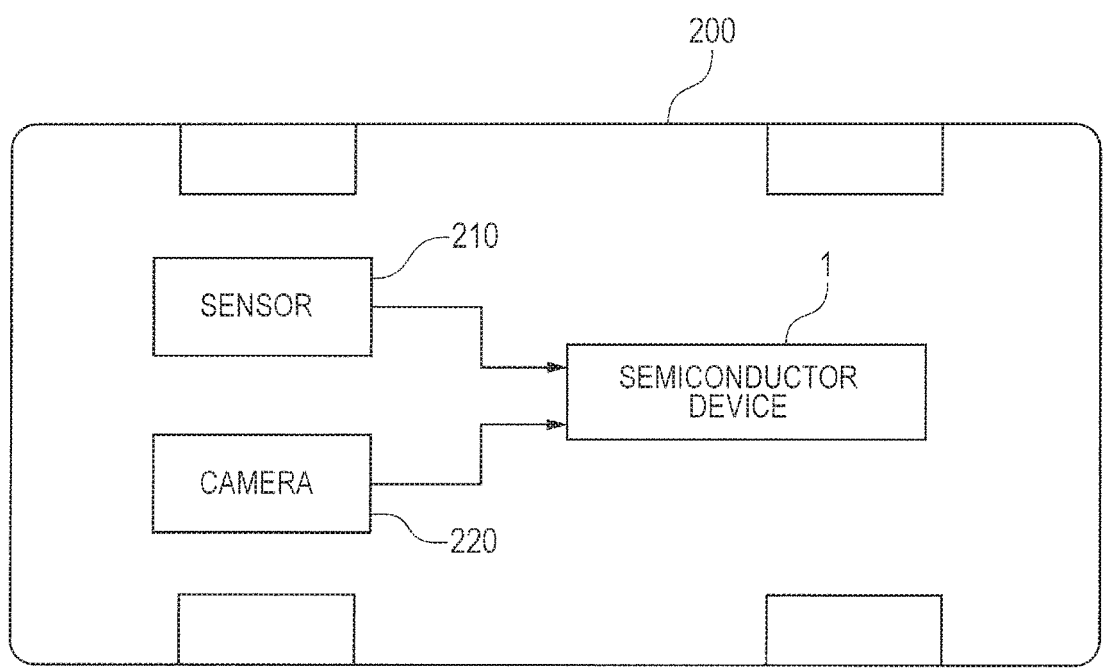
FIG. 16 is a block diagram illustrating an example of applying the semiconductor device according to the working example to a vehicle.

FIG. 16 is a block diagram illustrating an example of applying the semiconductor device according to the working example to a vehicle. As illustrated in FIG. 16, a vehicle 200 includes the semiconductor device (SEMICONDUCTOR DEVICE) 1, a sensor (SENSOR) 210, and a camera (CAMERA) 220. The semiconductor device 1 is provided as an in-vehicle chip. The sensor 210 acquires specified information about the vehicle 200. The camera 220 acquires video around the vehicle. The semiconductor device 1 is supplied with the information acquired by the sensor 210 and the camera 220. The semiconductor device 1 performs a specified process based on the information acquired by the sensor 210 and the camera 220. The semiconductor device 1 may be replaced by any one of the semiconductor devices according to the first through fourth modifications.

While there has been described the embodiment, the working example, and the modifications of the present invention created by the inventors, it is to be distinctly understood that the present invention is not limited to the embodiment, the working example, and the modifications, but may be otherwise variously modified.

What is claimed is:

1. A semiconductor device comprising:
 a memory that stores 1) a plurality of virtual machines and 2) a virtual machine manager to manage the virtual machines;
 a CPU that performs the virtual machines and the virtual machine manager; and
 an interrupt selection circuit,
 wherein, in response to an interrupt request being issued while a first virtual machine of the virtual machines is active and a second virtual machine of the virtual machines is inactive and the interrupt request is to be processed by the second virtual machine, the virtual machine manager stops the first virtual machine and switches the second virtual machine from inactive to active, and
 wherein, in response to a first interrupt request having a first priority and a second interrupt request having a second priority higher than the first priority being issued while the first virtual machine is active and the second virtual machine is inactive and the first interrupt request is to be processed by the first virtual machine and the second interrupt request is to be processed by the second virtual machine, the interrupt selection circuit selects the first interrupt request even if the second priority of the second priority of the second interrupt request is higher than the first priority of the first interrupt request.

2. The semiconductor device according to claim 1, further comprising:
 a message box that performs communication between the virtual machines,
 wherein each of the virtual machines includes an interrupt process subroutine,
 wherein the interrupt process subroutine includes a first end code and a second end code to branch to a return destination of the interrupt process subroutine,
 wherein the first end code includes a branch process that restores a process that was being performed by the virtual machine before the virtual machine processed the interrupt request, and
 wherein the second end code includes a process to cause the CPU to execute the virtual machine manager.

3. The semiconductor device according to claim 2,
 wherein the virtual machine manager includes an exception handler,
 wherein the interrupt request has first information indicating a virtual machine by which the interrupt request is to be processed,
 wherein, if the first information is equal to second information indicating an active virtual machine, the CPU executes the interrupt process subroutine for the active virtual machine, and
 wherein, if the first information differs from the second information, the exception handler is executed to assign the virtual machine indicated by the first information to the CPU, and the CPU executes an interrupt process subroutine for the virtual machine indicated by the first information.

4. The semiconductor device according to claim 3,
 wherein, if the first information is equal to the second information, the interrupt process subroutine for the active virtual machine includes a process to execute the first end code according to an instruction of the message box, and
 wherein, if the first information differs from the second information, the virtual machine manager includes a process to store an instruction to select the second end code in the message box and the interrupt process subroutine for the virtual machine indicated by the first information includes a process to execute the second end code.

5. The semiconductor device according to claim 4, wherein the second end code includes a process that stores an instruction to select the first end code in the message box and assigns a virtual machine, having been active before input of the interrupt request, to the CPU.

6. The semiconductor device according to claim 1, further comprising:
 an interrupt controller that outputs information indicating one of the virtual machines by which the interrupt request is to be processed based on an interrupt channel.

7. The semiconductor device according to claim 3, wherein if an execution period of the active virtual machine is shorter than a predetermined period by the interrupt request, an additional execution period is assigned for the virtual machine.

* * * * *